T. F. BATES.
DENTAL SCALER.
APPLICATION FILED SEPT. 23, 1914.

1,220,933. Patented Mar. 27, 1917.

Witnesses
Edwin J Beller.
Lewis Hatten.

Inventor
Thomas Fletcher Bates,
by Wilkinson, Guista & MacKaye,
Attorneys.

UNITED STATES PATENT OFFICE.

THOMAS F. BATES, OF SHELBYVILLE, TENNESSEE.

DENTAL SCALER.

1,220,933.  Specification of Letters Patent.  Patented Mar. 27, 1917.

Application filed September 23, 1914. Serial No. 863,158.

*To all whom it may concern:*

Be it known that I, THOMAS F. BATES, a citizen of the United States, residing at Shelbyville, in the county of Bedford and State of Tennessee, have invented certain new and useful Improvements in Dental Scalers; and I do hereby declare the following to be a full, clear, and exact description of the invention, such as will enable others skilled in the art to which it appertains to make and use the same.

My invention relates to improvements in dental scalers or instruments for removing calcareous deposits from the roots of teeth.
My invention is intended to provide an implement which comprises in a single tool the equivalent of a number of tools heretofore required to accomplish the same purpose. It employs a blade, the entire cutting edge of which is in definite curves without an angle, and may be used either to scrape plane surfaces, or to cut around convex surfaces, or to project into concave surfaces, at the same time without leaving angular scratches on the surface of the tooth.

My invention will be understood by reference to the accompanying drawings, in which.

Figure 1:
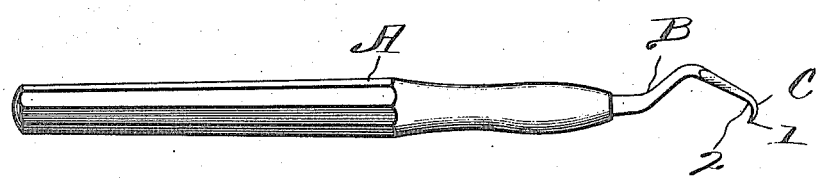
Figure 1 is a side elevation of the instrument.
Figure 2:
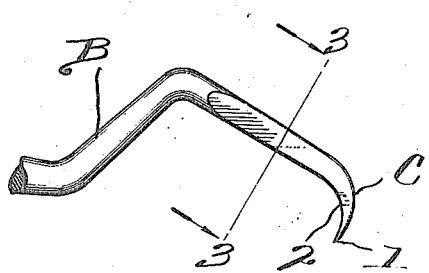
Fig. 2 is a detail view, on a larger scale, showing in side elevation the cutting blade.
Figure 3:
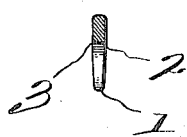
Fig. 3 is a view looking in the direction of the arrows shown in Fig. 2; and
Figure 4:
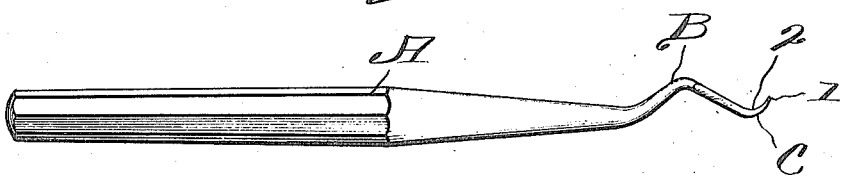
Fig. 4 shows a modification in which the blade is reversely disposed from that shown in Fig. 1.

A represents the handle, which may be made integral with the shank of the tool or separable therefrom, as desired. B represents the shank of the tool, which is bent in the usual way in such angles as to adapt it to the use in the mouth of the patient. At the end of this shank is the cutting blade C, which is in the form of a quadrant of a circle, having a rounded cutting tip 1, as shown, and two cutting edges 2 and 3, on each side of the concaved curved portion of the blade, as shown in exaggerated detail in Figs. 2 and 3. The back of the curved blade is preferably rounded, as shown, but it may also be provided with cutting edges, if desired.

In the manufacture of these instruments, while the shank of the blade is bent to adapt itself to the mouth of the patient for the purpose for which it is intended, the cutting blade is always substantially in the prolongation of the axis of the handle, so that there may be no tendency of the handle to twist in the hand of the operator when force is applied thereto.

The blade is set to the shank so that the tangent to the middle of the arc forming the blade makes an angle with the shank forty-five degrees greater than a right angle, throwing the shank just out of the line of the long axis of the root of the tooth, and causing the curve to act as a concave blade, taking the convexity of the root, and obviating the tendency to skid out of position.

With a slight change of position, the same blade may be used as a plane blade on flat surfaces. Again, in cleaning out grooves or depressions, the round point of the blade enters as a convex blade into the depressions and bifurcations of the roots of the teeth. The blades are used with a draw cut that removes the infectious débris instead of forcing it deeper into the uninfected area, as is done with the pushing instruments.

My improved blades are preferably rounded at the back, and their delicate forms enable the operator to engage the deposit at the bottom of the pocket with little pain and without unnecessary laceration.

The herein described blades are of very much less thickness than other instruments of equal strength heretofore used for similar purposes, and cut with equal efficiency on either face, accomplishing the result of several instruments in one.

With the herein described instruments there is no possibility for the blade to pack or clog with the deposit, causing it to fail to engage or glide over a deposit at the second stroke, as files and some other forms of scalers now in use will do.

The taper of the shank gives the proper angle to the cutting edge for engaging and planing the surface smooth.

The instruments are easily sharpened without any special mechanical device, by laying each side flat on a whetstone, and then by drawing a round sharpening whetstone across the curve, while the point may be rounded by drawing it through a grooved whetstone, or as you would sharpen a spoon. The cutting edges of all of the blades must be kept sharp to make the instrument effective.

The instruments become more delicate as they are worn down by sharpening, and can be used until quite worn out.

The instruments may also be used to advantage in the trimming of the margins of approximal fillings at the gingival border.

In the manufacture of the device I purpose to provide a series of instruments each having the shank bent differently for the different position in which it is to be used in the mouth, all of the complete set of instruments carrying at the end of the shank the same peculiar blade, as has already been described and as illustrated in the drawings, the function and operation of which blade has been hereinbefore fully set out.

Having thus described my invention, what I claim and desire to secure by Letters Patent of the United States is:

1. A dental instrument comprising a handle, and an angularly bent shank projecting from said handle, and a blade flattened on both sides and forming the termination of said shank and having its cutting edges in the continuation of the axis of said handle, said blade being curved to form a quadrant of a circle whose radius is substantially the average radius of the tooth root to be operated upon, said quadrant having cutting edges on each side of the concave portion thereof, and having the convex portion thereof rounded, and each side of said blade lying in a plane at right angles to the concave surface referred to, substantially as described.

2. A dental instrument comprising a handle, and an angularly bent shank projecting from said handle, and a blade flattened on both sides forming the termination of said shank and having its cutting edges in the continuation of the axis of said handle, said blade being curved to form a quadrant of a circle whose radius is substantially the average radius of the tooth root to be operated upon, said quadrant having cutting edges on each side of the concave portion thereof, and having the convex portion thereof rounded, and each side of said blade lying in a plane at right angles to the concave surface referred to, and the tip of said blade being rounded, substantially as and for the purposes described.

In testimony whereof, I affix my signature, in presence of two witnesses.

THOS. F. BATES.

Witnesses:
PAUL B. MYERS,
E. C. PARKER.